United States Patent
Said et al.

(10) Patent No.: US 9,641,823 B2
(45) Date of Patent: May 2, 2017

(54) EMBEDDED LIGHT FIELD DISPLAY ARCHITECTURE TO PROCESS AND DISPLAY THREE-DIMENSIONAL LIGHT FIELD DATA

(75) Inventors: Amir Said, Cupertino, CA (US); Ton Kalker, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 922 days.

(21) Appl. No.: 13/018,241

(22) Filed: Jan. 31, 2011

(65) Prior Publication Data

US 2012/0194654 A1  Aug. 2, 2012

(51) Int. Cl.
*H04N 13/00* (2006.01)
*H04N 21/2365* (2011.01)

(52) U.S. Cl.
CPC ..... *H04N 13/0059* (2013.01); *H04N 21/2365* (2013.01)

(58) Field of Classification Search
CPC .................................................. H04N 13/0059
USPC ......... 348/51; 345/6, 419, 501; 359/10, 284; 356/213, 311; 709/230; 382/40
See application file for complete search history.

(56) References Cited

U.S. PATENT DOCUMENTS

| | | | |
|---|---|---|---|
| 2007/0033289 A1* | 2/2007 | Nuyttens et al. | ............. 709/230 |
| 2007/0080971 A1 | 4/2007 | Sung | |
| 2008/0043095 A1* | 2/2008 | Vetro et al. | ..................... 348/51 |
| 2008/0247641 A1 | 10/2008 | Rasmusson et al. | |
| 2010/0040297 A1* | 2/2010 | Ohba et al. | ................... 382/232 |
| 2010/0149139 A1 | 6/2010 | Kroll et al. | |
| 2010/0149311 A1* | 6/2010 | Kroll et al. | ..................... 348/40 |

* cited by examiner

*Primary Examiner* — Tung Vo
*Assistant Examiner* — Rowina Cattungal
(74) *Attorney, Agent, or Firm* — HP Inc. Patent Department (57) ABSTRACT

An embedded light field display architecture to process and display three-dimensional light field data in a light field display is provided. The light field display architecture includes a plurality of hierarchical modules to decode compressed light field data associated with a light field and a plurality of tile modules embedded directly in the light field display to process light field data for display. A plurality of networking modules is also provided to transmit light field data among the hierarchical modules and the tile modules.

20 Claims, 5 Drawing Sheets

)# EMBEDDED LIGHT FIELD DISPLAY ARCHITECTURE TO PROCESS AND DISPLAY THREE-DIMENSIONAL LIGHT FIELD DATA

BACKGROUND

Light field displays have emerged to provide viewers a more accurate visual reproduction of three-dimensional ("3D") real-world scenes without the need for specialized viewing glasses. Such displays emulate a light field, which represents the amount of light traveling in every direction through every point in space. The goal is to enable multiple viewers to simultaneously experience a true 3D stereoscopic effect from multiple viewpoints, by capturing a light field passing through a physical surface and emitting the same light field through a display screen. Doing so has the potential to revolutionize many visual-based applications in areas as diverse as entertainment, business, medicine, and art, among others.

Light field displays typically operate in conjunction with an array of cameras and an array of projectors. The array of cameras is used to acquire the light fields and the array of projectors is used to display the light fields onto a display screen. Instead of pixel elements that generate light that is spread in all directions, each element in the display screen generates light beams with different colors and intensities for different viewing directions. Providing a true 3D experience therefore requires light to be modulated on several million display elements, which in turn generate different light values for thousands of different directions. This results in extremely large amounts of data to be processed for each display element.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

An embedded display architecture is disclosed to efficiently process light field data for a light field display. A light field display, as generally described herein, is a display capable of receiving and displaying light field data. Light field data, which represents the amount of light traveling in every direction through every point in space, may include both light field information such as view depth as well as visual data corresponding to the light field (e.g., RGB, YCrCb data, and so on). Each element in the display screen, referred to herein as a "projexel", generates light beams with different colors and intensities for different viewing directions. The display screen may be a tiled array/matrix of projexels, with each tile representing a collection of projexels. Examples of light field displays may include holographic displays, parallax displays, volumetric displays, lenticular displays, or any other type of display capable of reproducing a light field, such as displays integrated with special purpose lenses and optical components.

In various embodiments, the light field data may include compressed light field data acquired by one or multiple cameras in a camera array and encoded by one or multiple encoders, such as MPEG encoders, H.26* encoders, multi-view encoders, hierarchical encoders, or any other type of encoder for compressing visual information. The acquired, compressed light field data is delivered directly to the light field display architecture, and in particular, to modules and buffers embedded in a display screen in near proximity to the projexels in its tiles. The display architecture, as described in more detail herein below for various embodiments, includes networking modules for delivering a variable amount of light field data to different modules, buffers, and parts of the display at different times, thereby enabling efficient hierarchical, predictive, context-based, and motion-related decoding of light field data.

It is appreciated that embodiments of the light field display architecture described herein below may include additional modules. Some of the modules may be removed, and/or modified without departing from a scope of the light field display architecture. It is also appreciated that, in the following description, numerous specific details are set forth to provide a thorough understanding of the embodiments. However, it is appreciated that the embodiments may be practiced without limitation to these specific details. In other instances, well known methods and structures may not be described in detail to avoid unnecessarily obscuring the description of the embodiments. Also, the embodiments may be used in combination with each other.

Figure 1:
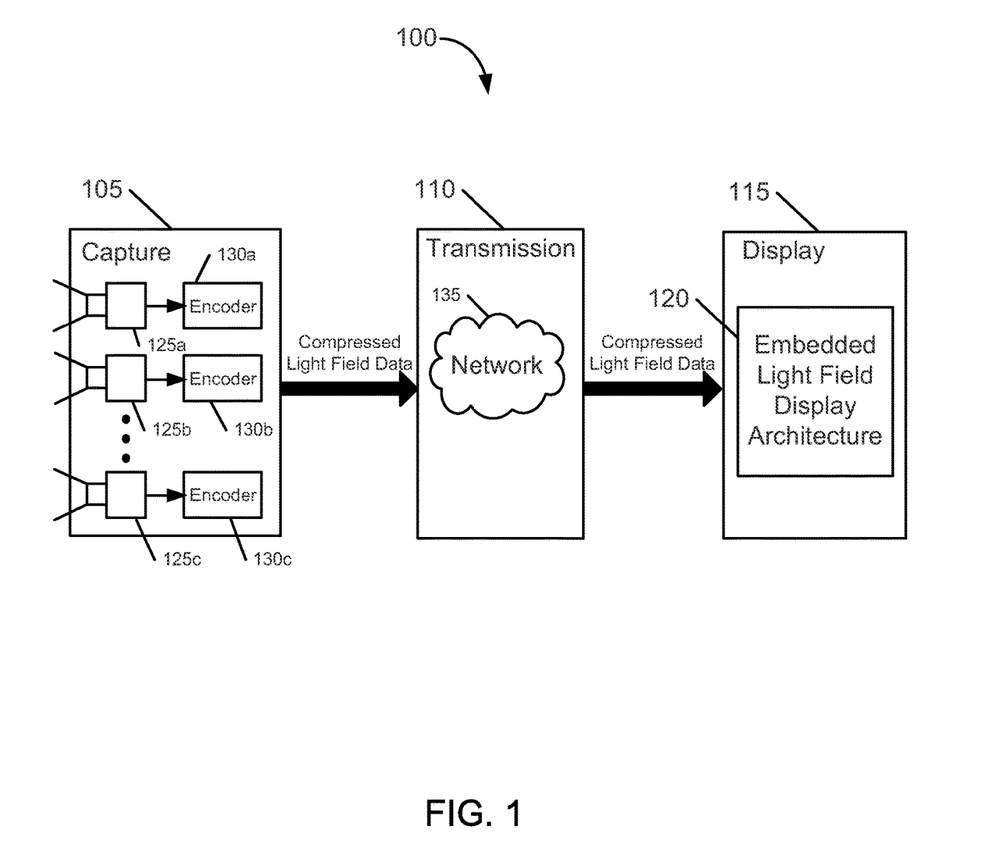
FIG. 1 illustrates an example of an architecture on which embodiments may be implemented for displaying light fields.

Referring now to FIG. 1, an example of an architecture on which the embodiments may be implemented for displaying light fields is illustrated. Architecture 100 is composed of three main portions: a capture portion 105, a transmission portion 110, and a display portion 115. Display portion 115 includes the embedded light field display architecture 120 for processing and displaying light field data.

A 3D light field may be captured by one or more cameras in a camera array within capture portion 105, such as, for example, cameras 125a-c. Each camera may capture images and video in real-time representing multiple viewpoints to create a dynamic light field. The cameras 125a-c may be aligned and placed in a given configuration (e.g., spaced apart in a linear configuration) or arranged arbitrarily. It is appreciated that the cameras 125a-c may be integrated into a single camera device or include multiple camera devices. It is also appreciated that cameras 125a-c may include any type of camera capable of acquiring digital images and video, such as, for example, CCD cameras, CMOS cameras, and the like.

The data captured by cameras 125a-c may be typically encoded/compressed by one or more encoders, such as, for example, encoders 130a-c. Each encoder may generate encoded/compressed data according to one or more coding approaches, such as those outlined in the various MPEG, H.26*, and other coders. Those of skill in the art would appreciate that the encoders 130a-c may be separate from or integrated with the cameras 125a-c.

The compressed data generated by the encoders 130a-c is transmitted to the display portion 115 via a network 135, which may be the Internet, a broadband network, or any other network used for sending data between a source and a destination. Alternatively, in one embodiment, the capture portion 105 and the display portion 115 may be integrated (e.g., in a one or more devices) such that the network 135 may not be needed for transmitting the compressed data from the capture portion 105 to the display portion 115. Instead, network modules may be added to the integrated device(s) for sending data between the capture portion 105 and the display portion 115, such as, for example, network modules in the cameras 125a-c or in the encoders 130a-c.

The display portion 115 includes the embedded light field display architecture 120 for decoding and processing the compressed data sent by the capture portion 105 in order to extract and display the 3D light field captured by the capture portion 105. The embedded light field display architecture 120, described in more detail herein below, is designed to exploit the large amounts of redundancy present in natural light fields, so that the amount of information processed is greatly reduced through a sophisticated architecture embedded directly in the light field display.

Figure 2:
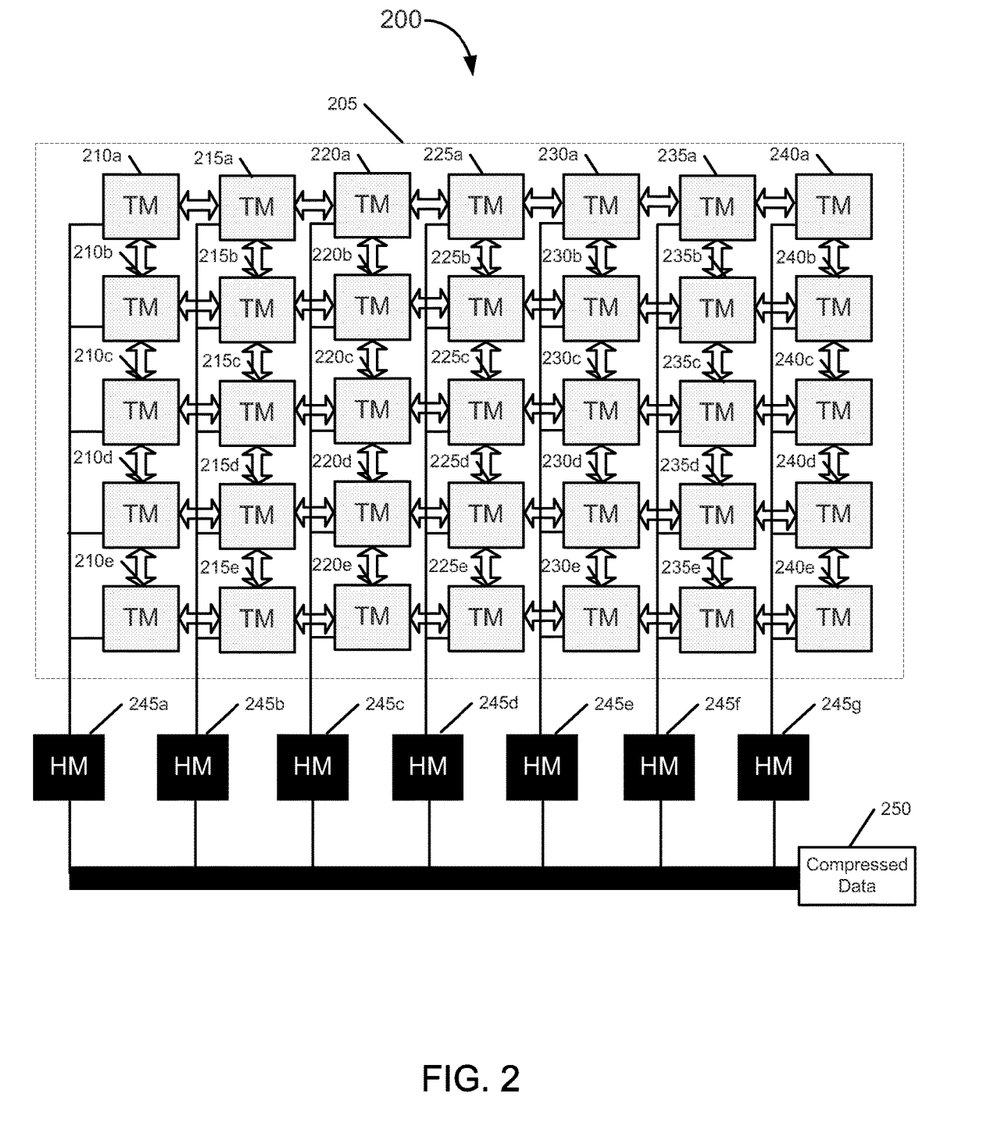
FIG. 2 is an example block diagram of the embedded light field display architecture of FIG. 1 in more detail.

Attention is now directed to FIG. 2, which illustrates an example block diagram of the embedded light field display architecture of FIG. 1 in more detail. Light field display architecture 200 is an embedded display architecture for displaying the light fields acquired by the capture portion 105. As such, light display architecture 200 includes various modules that are embedded directly in a light field display to efficiently decode and process the compressed data 250 encoded in the capture portion 105. The light field display may include a tiled display screen 205, wherein each tile represents a collection of projexels.

The various modules embedded in the light field display architecture 200 may include, for example, a series of hierarchical modules ("HMs") and a series of tile modules ("TM"), all interconnected by a data network represented in FIG. 2 by shaded lines and double arrows. The data network enables delivery of variable amounts of data to different parts of the light field display, depending on the specific light field being displayed. Accordingly, the data network may include various networking modules (not shown) and data buses for efficiently delivering the data.

The HMs, described in more detail below with reference to FIG. 3, include hierarchical decoders for decoding and processing the compressed data 250 to extract high-level information about the light fields acquired by the cameras 125a-c in the capture portion 105. Such high-level information may be, for example, view depth information, projexel data, or any other information that may be used to recreate the acquired light fields from the compressed data 250.

In various embodiments, the HMs may make content-based decisions on how much of the light field data is to be extracted and decoded from the compressed data 250. Any data that is not decoded by the HMs may be locally decoded by a TM. The TMs, described, in more detail below with reference to FIG. 4, may therefore receive both already decoded high-level light field information (e.g., view depth) and light field data as well as compressed light field data from the HMs. The goal is to distribute the processing of the data as much and as efficiently as possible by exploiting the redundancy in the light field captured by the capture portion 105. Light field data, as generally described herein, may therefore include both compressed light field data as well as uncompressed light field data, e.g., view depth, projexel data, and so on.

It is appreciated that the tiled display screen 205 may include any number of tiles in a matrix configuration. One or more of the tiles in the tiled display screen 200 has a TM embedded directly thereon, and each TM is connected to one or more HMs and one or more other TMs. In one embodiment, a given TM embedded in a given tile may be embedded in near proximity to the collection of projexels in the tile.

In one example shown in FIG. 2, a HM is associated with multiple TMs in a tile column of the tiled display 205. For example, HM 245a may distribute data to one or more of TMs 210a-e, HM 245b may distribute data to one or more of TMs 215a-e, HM 245c may distribute data to one or more of TMs 220a-e, HM 245d may distribute data to one or more of TMs 225a-e, HM 245e may distribute data to one or more of TMs 230a-e, HM 245f may distribute data to one or more of TMs 235a-e, and HM 245g may distribute data to one or more of TMs 240a-e. The data is distributed such that neighboring TMs may have full bandwidth exchange of data to exploit redundancies in the data and therefore achieve high compression rates.

It is appreciated that HMs 245a-g and the TMs 210a-e, 215a-e, 220a-e, 225a-e, 230a-e, 235a-e, and 240a-e may comprise software modules, hardware modules, or a combination of software and hardware modules. Thus, in one embodiment, one or more of the modules 245a-g and 210a-e, 215a-e, 220a-e, 225a-e, 230a-e, 235a-e, and 240a may comprise circuit components. In another embodiment, one or more of the modules 245a-g and 210a-e, 215a-e, 220a-e, 225a-e, 230a-e, 235a-e, and 240a may comprise software code stored on a computer readable storage medium, which is executable by a processor.

According to various embodiments, the HMs 245a-g and the TMs 210a-e, 215a-e, 220a-e, 225a-e, 230a-e, 235a-e, and 240a-e may be used to execute one or more computer programs performing the methods, steps and functions described herein. One or more of the HMs and TMs may include one or more processors for executing the computer programs thereon. One or more of the HMs and TMs may also include various memories, such as a Random Access Memory ("RAM"), a Read Only Memory ("ROM"), an Erasable, Programmable ROM ("EPROM"), an Electrically Erasable, Programmable ROM ("EEPROM"), and/or any other data storage device, including hard disks, where the computer programs may reside during runtime.

Figure 3:
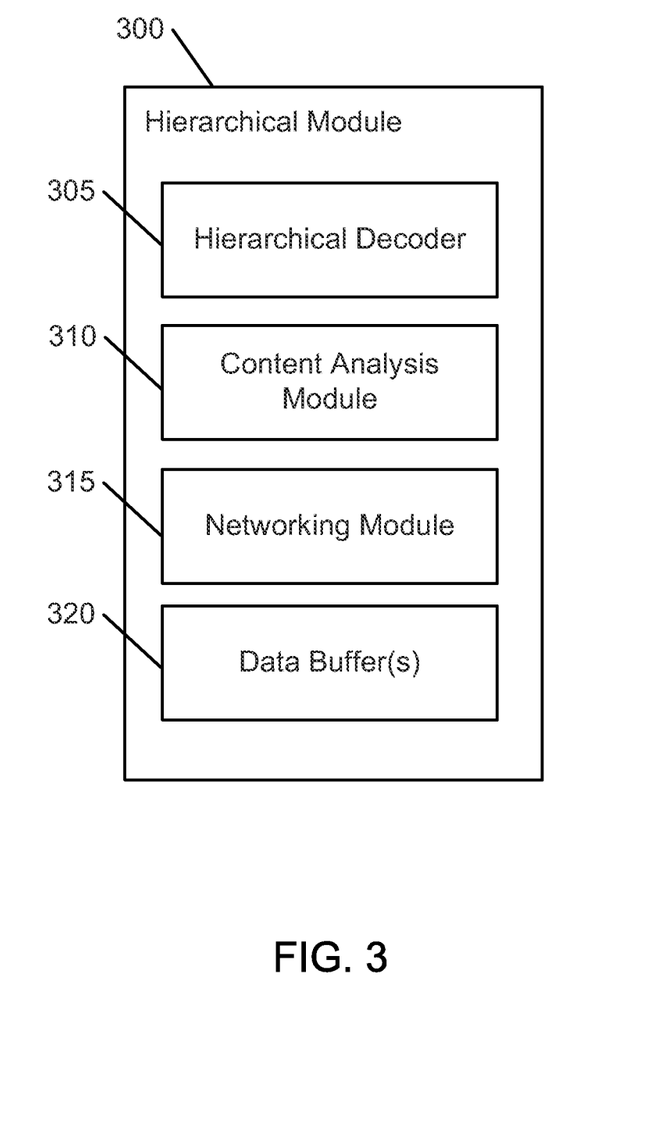
FIG. 3 is an example block diagram of a hierarchical module.

Referring now to FIG. 3, an example block diagram of a hierarchical module is illustrated. In various embodiments, HM 300 includes a hierarchical decoder 305, a content analysis module 310, a networking module 315, and a data buffer module 320 containing one or more data buffers. When the compressed data 250 is sent to the light field display architecture 200, the data is distributed to one or more of HMs 300, where it may be stored in the data buffer module 320. Each HM 300 may get a portion of the compressed data 250. The portion sent to a given HM 300 may correspond to a portion of data extracted from a single or multiple camera(s) in the capture portion 105.

The data is then decoded by the hierarchical decoder 305, which, as described above, decodes and processes the compressed data 250 to extract high-level information about the light fields acquired in the capture portion 105. Such high-level information may be, for example, view depth information or any other information that may be used to recreate the acquired light fields from the compressed data 250.

The hierarchical decoder 305 may also decode some or all of the portion of the compressed data 250 stored in data buffer module 320 to extract visual projexel data (e.g., RGB data, YCrCb data, and so on). In one embodiment, the hierarchical decoder 305 is a content-based decoder such that the amount of data decoded within HM 300 depends on the content of the data. Accordingly, the content analysis module 310 may be used to analyze the content of the light field data stored in data buffer module 320 to determine whether to decode it within HM 300 or distribute it for processing at one or more TMs. Doing so enables the light field display architecture 200 to more efficiently distribute processing of the light field data, thereby enabling full motion, difference, and context-based decoding in both HMs and TMs. The distribution of data is performed with networking module 315, which is capable of delivering variable amounts of data to one or more TMs connected to HM 300.

It is appreciated that any combination of the hierarchical decoder module 305, the content analysis module 310, the networking module 315, and the data buffer module 320 may be integrated in one or more modules. Furthermore, it is appreciated that the hierarchical decoder module 305 may implement one or more decoding methods, such as MPEG, H.26*, or any other type of decoding method for decoding/decompressing visual information.

Figure 4:
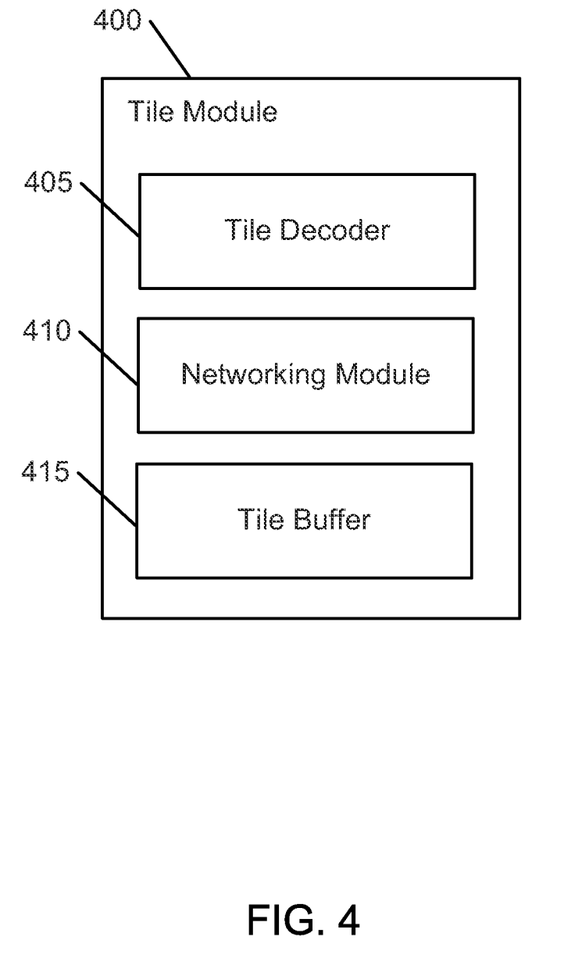
FIG. 4 is an example block diagram of a tile module.

Referring now to FIG. 4, an example block diagram of a tile module is illustrated. In various embodiments, the TM 400 includes a tile decoder 405, a networking module 410, and a tile buffer module 415 containing one or more data buffers. The tile decoder 405 may receive light field data from a HM in its corresponding tile column, and/or another TM in the tiled display and store the data at the buffers in the tile buffer module 415. For example, in FIG. 2, the tile decoders in the TMs 210a-e may receive data from the HM 245a, the tile decoders in the TMs 215a-e may receive data from the HM 245b, the tile decoders in the TMs 220a-e may receive data from the HM 245c, the tile decoders in the TMs 225a-e may receive data from the HM 245d, the tile decoders in the TMs 230a-e may receive data from the HM 245e, the tile decoders in the TMs 235a-e may receive data from the HM 245f, and the tile decoders in the TMs 240a-e may receive data from the HM 245g.

The data received by the TM 400 may be already decoded data (i.e., at the HM) or compressed data sent to the TM 400 for decoding. As described above, decoding of light field data is performed in a hierarchical, content-based manner to take advantage of the redundancies in the data and more efficiently process the data for display. In one embodiment, such redundancies may be spatial, temporal, or a combination of spatial and temporal redundancies.

The compressed data that is sent to the TM 400 for decoding is decoded by the tile decoder 405, which may be a hierarchical decoder, a context-based decoder, or any other type of decoder or combination of decoders used for decoding light field data. In one embodiment, the tile decoder 405 in the TM 400 communicates with neighboring tile decoders in neighboring TMs to exploit the redundancies in the data during its decoding. For example, the tile decoder in the TM 210a may communicate with the tile decoder in the TM 215a and the tile decoder in the TM 210b to share information for exploiting spatial and/or temporal redundancies in the data. For example, data in the TM 210a may be used as a reference to predict data in the TM 215b and/or the TM 210b, and vice-versa.

Data communications between two TMs or between a TM and a HM are handled by the networking module in the TM (and by the networking module in the HM in case of TM-HM communications), e.g., the networking module 410 in TM 400. The networking module 410 may include various communications and networking modules to enable communications between neighboring TMs for predictive, context-based, motion-related, or any other decoding method for exploiting redundancies in the data.

It is appreciated that any combination of the tile decoder 405, the networking module 410, and the tile buffer module 415 may be integrated in one or more modules. Furthermore, it is appreciated that the tile decoder 405 may implement one or more decoding methods, such as MPEG, H.26*, or any other type of decoding method for decoding/decompressing visual information.

Figure 5:
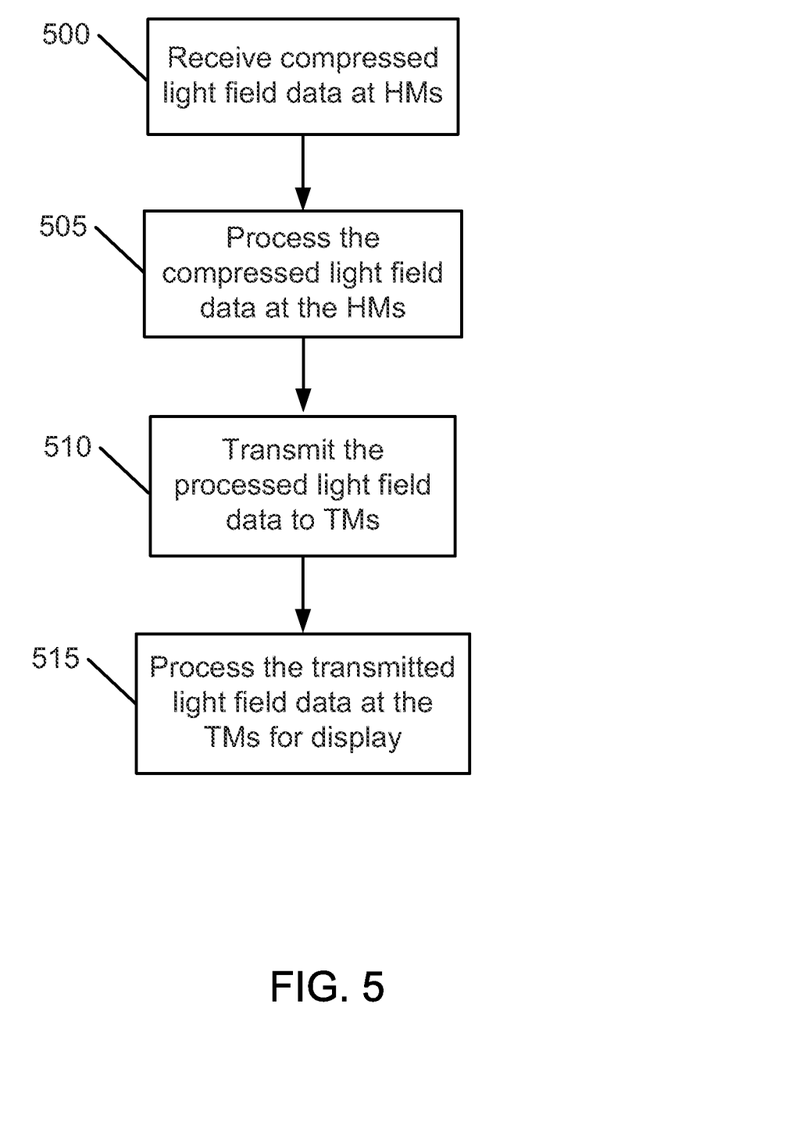
FIG. 5 is an example flowchart for displaying a light field in a light field display.

Referring now to FIG. 5, a flowchart for displaying a light field in accordance with various embodiments is described. First, one or more HMs receive compressed light field data (505). The compressed light field data may, for example, correspond to a light field acquired by the capture portion 105 shown in FIG. 1. The HMs process the compressed light field data (510) and transmit the processed data to one or more TMs (515). In processing the compressed light field data, the HMs may decode a portion or all of the light field data as described above. The decoded portion (if any) and the rest of the light field data may be sent to one or more TMs, such as, for example, a given HM sending its data (decoded or not) to one or more TMs in a tile column of the light field display. The transmitted data is processed at the TMs for display as described above with reference to FIG. 4 (520).

It is appreciated that having TMs embedded directly in the display screen significantly reduces the data processing burden of the HMs and enables data transmission to be more manageable and efficient among all modules of the display. High refresh rates of the projexels in the display screen may be maintained, while efficiently exploiting data redundancies and distributing the decoding and processing of data (e.g., according to the content of the data) to multiple modules. It is also appreciated that the embodiments described herein may be implemented with a variety of compression schemes, such as MPEG, H.26*, or any other type of compression scheme for coding/decoding visual information, including those developed to exploit the light field display architecture 120.

In some example implementations, one or more of the example steps of FIG. 5 may be implemented using machine readable instructions that, when executed, cause a device (e.g., a programmable controller or other programmable machine or integrated circuit) to perform the operations shown in FIG. 5. For instance, the example steps of FIG. 5 may be performed using a processor, a controller, and/or any other suitable processing device. For example, the example steps of FIG. 5 may be implemented in coded instructions stored on a tangible machine readable medium such as a flash memory, a read-only memory ("ROM"), and/or a random-access memory ("RAM") associated with a processor or controller. As used herein, the term tangible computer readable medium is expressly defined to include any type of computer readable storage medium.

Additionally or alternatively, the example steps of FIG. 5 may be implemented using coded instructions (e.g., computer readable instructions) stored on a non-transitory computer readable medium such as a flash memory, a read-only memory ("ROM"), a random-access memory ("RAM"), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium.

Alternatively, the example steps of FIG. 5 may be implemented using any combination(s) of application specific integrated circuit(s) ("ASIC(s)"), programmable logic device(s) ("PLD(s)"), field programmable logic device(s) ("FPLD(s)"), discrete logic, hardware, firmware, and so on. Also, the example steps of FIG. 5 may be implemented as any combination(s) of any of the foregoing techniques, for example, any combination of firmware, software, discrete logic, and/or hardware. Further, although the example steps of FIG. 5 are described with reference to the flow diagram illustrated thereon, other methods of implementing the steps of FIG. 5 may be employed. For example, the order of execution of the blocks may be changed, and/or some of the blocks described may be changed, eliminated, sub-divided, or combined. Additionally, any or all of the example steps of FIG. 5 may be performed sequentially and/or in parallel by, for example, separate processing threads, processors, devices, discrete logic, circuits, and so on.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

Those of skill in the art would further appreciate that the various illustrative modules and steps described in connection with the embodiments disclosed herein may be implemented as electronic hardware, computer software, or combinations of both. For example, the HMs and TMs shown in FIG. 2 may comprise software modules, hardware modules, or a combination of software and hardware modules. Thus, in one embodiment, one or more of the HMs and TMs may comprise circuit components. In another embodiment, one or more of the HMs and TMs may comprise software code stored on a computer readable storage medium, which is executable by a processor.

To clearly illustrate this interchangeability of hardware and software, various illustrative components, blocks, modules, and steps have been described above generally in terms of their functionality (e.g., hierarchical decoder 305 in HM 300 for decoding compressed data, networking module 410 in TM 400 for handling data communications, and so on). Whether such functionality is implemented as hardware or software depends upon the particular application and design constraints imposed on the overall system. Those skilled in the art may implement the described functionality in varying ways for each particular application, but such implementation decisions should not be interpreted as causing a departure from the scope of the present disclosure.

What is claimed is:

1. A light field display architecture for displaying a light field in a light field display, the light field display architecture comprising:
   a plurality of hierarchical modules to decode a portion of compressed light field data associated with a light field;
   a plurality of tile modules embedded in the light field display to receive both uncompressed and compressed light field data from the plurality of hierarchical modules for local processing and display at the light field display; and
   a plurality of networking modules to communicate light field data within the light field display architecture.

2. The light field display architecture of claim 1, wherein a hierarchical module from the plurality of hierarchical modules comprises a hierarchical decoder to decode the compressed light field data.

3. The light field display architecture of claim 1, wherein a tile module from the plurality of tile modules comprises a tile decoder to decode light field data transmitted from at least one hierarchical module from the plurality of hierarchical modules.

4. The light field display architecture of claim 1, wherein a tile module from the plurality of tile modules comprises a tile decoder to decode light field data transmitted from at least one other tile module from the plurality of tile modules.

5. The light field display architecture of claim 1, wherein the plurality of networking modules communicate light field data between at least one hierarchical module from the plurality of hierarchical modules and at least one tile module from the plurality of tile modules.

6. The light field display architecture of claim 1, wherein the plurality of networking modules communicate light field data between a tile module from the plurality of tile modules and at least one more tile module from the plurality of tile modules.

7. A light field display for displaying a light field, the light field display comprising:
   a display screen having a plurality of tiles;
   a plurality of hierarchical modules to process a portion of compressed light field data for a subset of the plurality of tiles; and
   a plurality of tile modules embedded in at least one of the plurality of tiles to receive both uncompressed and compressed light field data from the plurality of hierarchical modules for local processing and display at the display screen.

8. The light field display of claim 7, wherein a tile from the plurality of tiles comprises a collection of projexels.

9. The light field display of claim 8, wherein the plurality of tile modules are embedded in near proximity to the collection of projexels.

10. The light field display of claim 7, wherein a tile module from the plurality of tile modules comprises a networking module to communicate light field data to at least one other tile module from the plurality of tile modules and to at least one hierarchical module from the plurality of hierarchical modules.

11. The light field display of claim 7, wherein a hierarchical module from the plurality of hierarchical modules comprises a hierarchical decoder to process the portion of compressed light field data.

12. The light field display of claim 11, wherein the hierarchical decoder comprises a content-based decoder to process the portion of the compressed light field data based on a content of the compressed light field data.

13. The light field display of claim 12, wherein the hierarchical module from the plurality of hierarchical modules comprises a content analysis module to analyze the content of the compressed light field data.

14. The light field display of claim 7, wherein a hierarchical module from the plurality of hierarchical modules comprises a networking module to transmit light field data processed at the hierarchical module to the plurality of tile modules.

15. The light field display of claim 14, wherein the processed light field data comprises compressed light field data.

16. The light field display of claim 14, wherein the processed light field data comprises information associated with a light field.

17. The light field display of claim 16, wherein the information comprises a view depth.

18. The light field display of claim 14, wherein a tile module from the plurality of tile modules comprises a tile decoder to decode the light field data processed at the hierarchical module.

19. A non-transitory computer readable storage medium, comprising executable instructions to:
   receive compressed light field data at a plurality of hierarchical modules;
   process a portion of the compressed light field data at the plurality of hierarchical modules; and
   transmit the processed light field data to a plurality of tile modules embedded in a light field display for local processing and display at the light field display, wherein the processed light field data transmitted from the plurality of hierarchical modules comprises both compressed and uncompressed light field data.

20. The computer readable storage medium of claim 19, wherein a tile module from the plurality of tile modules is embedded in the light field display near a collection of projexels.

* * * * *